March 20, 1962   H. E. LA RUE   3,025,703
SLIP TUBE GAUGE FOR LP-GAS TANKS

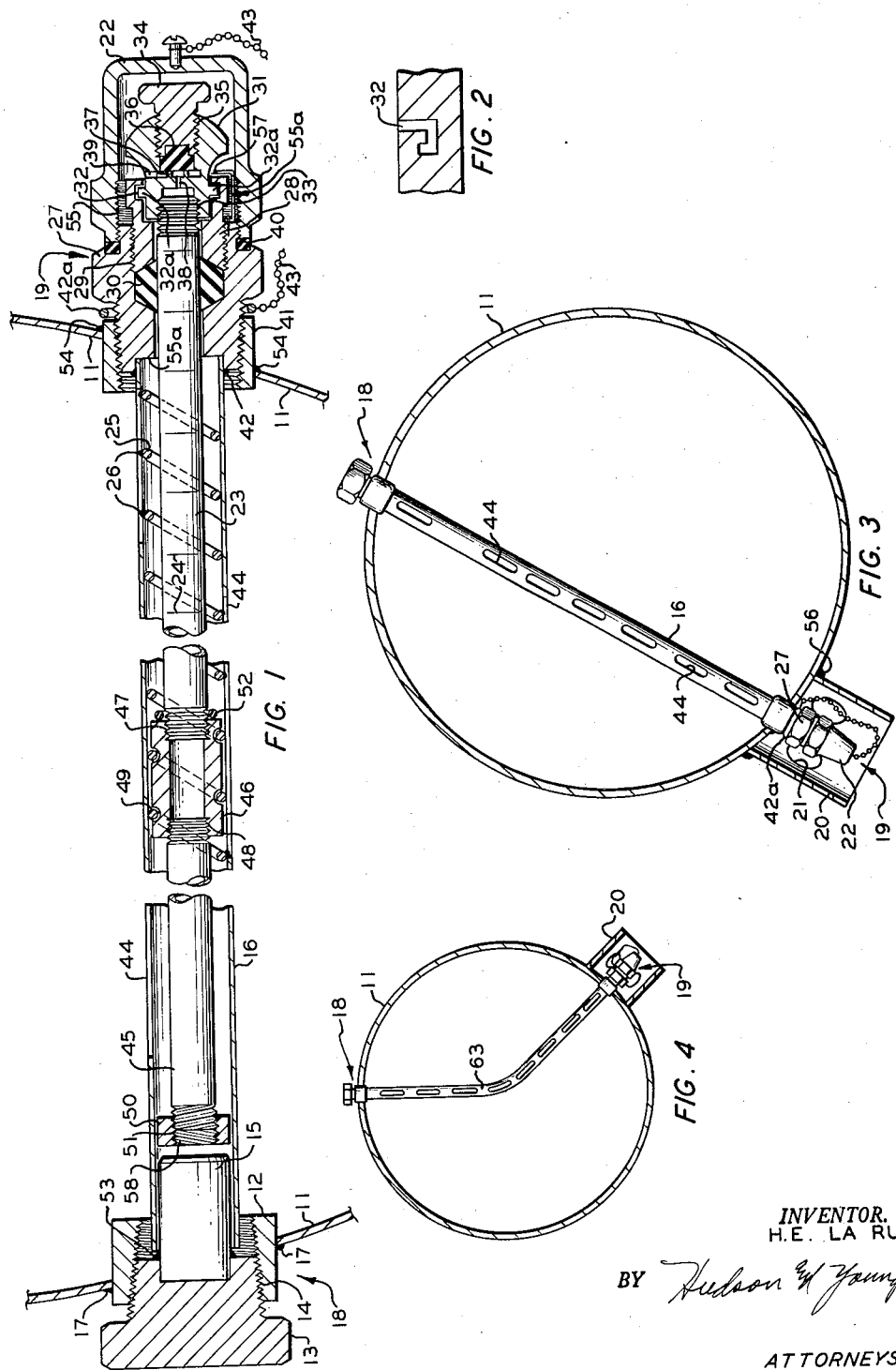

Filed Feb. 5, 1959   2 Sheets-Sheet 2

INVENTOR.
H.E. LA RUE
BY *Hudson & Young*

ATTORNEYS

United States Patent Office 3,025,703
Patented Mar. 20, 1962

3,025,703
SLIP TUBE GAUGE FOR LP-GAS TANKS
Harold E. La Rue, Bartlesville, Okla., assignor to Phillips Petroleum Company, a corporation of Delaware
Filed Feb. 5, 1959, Ser. No. 791,359
3 Claims. (Cl. 73—298)

This invention relates to apparatus for gauging liquid under pressure in the tank. In one aspect, it relates to apparatus for gauging liquefied petroleum gas in transport truck tanks.

When filling tanks of transport trucks with liquefied petroleum gas (LP-Gas) current practice for gauging such tanks is to use a roto-gauge for determination of deliveries to the truck tank. Roto-gauges are often damaged through vibration and shock resulting from travel over roads and highways and thus become inaccurate. It has been found that in many cases serious errors have occurred in gauging liquid volumes loaded into transport trucks. These errors in some instances involve loading of too large a volume of liquid, and in other instances too small a volume of product into the tank. Obviously, it is desired to be able to load the exact volume of product desired into the tank.

An object of this invention is to provide a gauging apparatus for accurately gauging liquid under pressure in the tank. Another object is to provide a gauge for accurately gauging liquid under high pressure in transport truck tanks. Yet another object of this invention is to provide such a gauging apparatus which is accurate and safe to operate. Still another object of this invention is to provide a gauge for gauging liquid under pressure in truck tanks which gauge is not susceptible to damage due to vibration as the truck travels over roads and highways. Still another object of this invention is to provide a gauging apparatus for gauging such high pressure liquids which gauges are adaptable for rapid determination of liquid level in the tank. Other objects and advantages of this invention will be realized from reading the following description which taken with the attached drawing forms a part of this specification.

Figure 5:
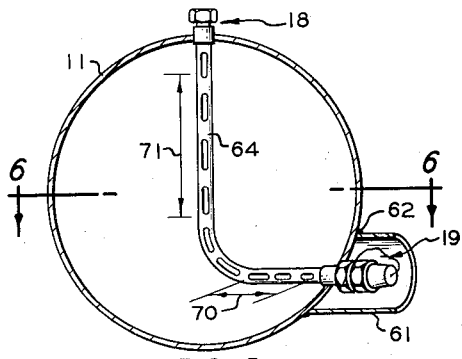
Figure 6:
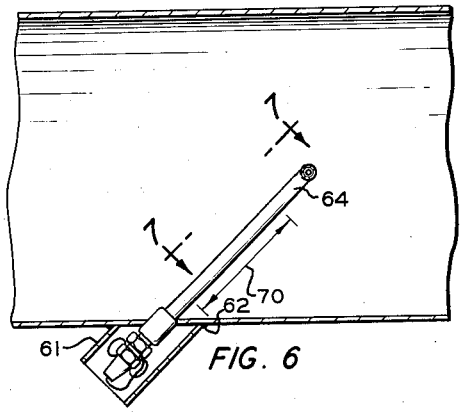
Figure 7:
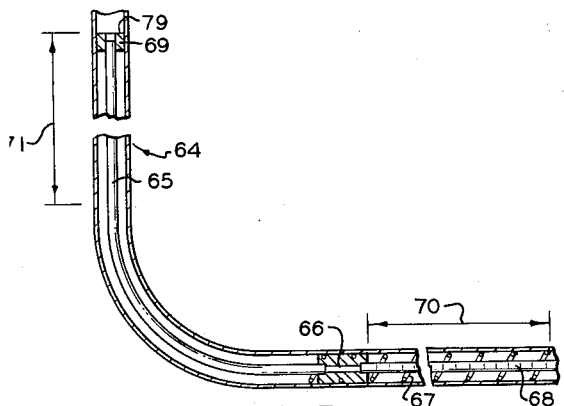
Figure 8:
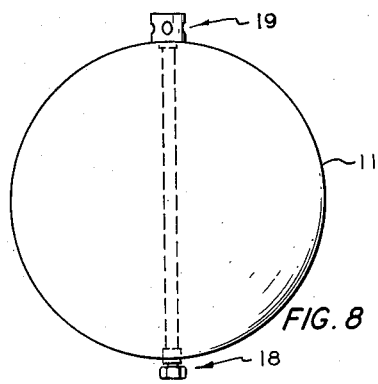
Figure 9:
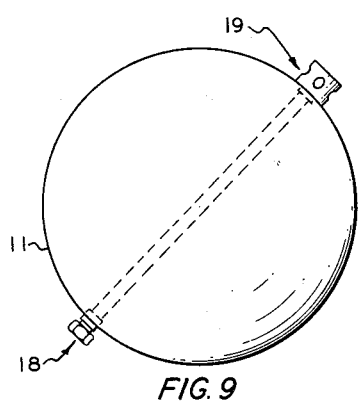
Figure 10:
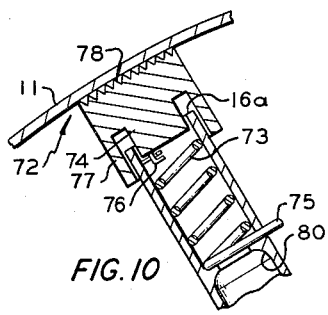

In the drawing, FIGURE 1 is a longitudinal view, partly in section, of one embodiment of my invention. FIGURE 2 is an enlarged view of a portion of FIGURE 1. FIGURE 3 is a sectional view of a tank provided with the liquid level gauge of my invention. FIGURE 4 is a sectional view of a tank provided with another embodiment of my liquid level gauge. FIGURE 5 is a sectional view of a tank provided with still another embodiment of my liquid level gauge. FIGURE 6 is a plan view, partly in section, taken on the line 6—6 of FIGURE 5. FIGURE 7 is a view, partly in section, taken on the line 7—7 of FIGURE 6. FIGURES 8 and 9 illustrate diagrammatically other arrangements of liquid level gauge of my invention in a tank. FIGURE 10 illustrates an alternate embodiment of a portion of the apparatus of FIGURE 1.

According to my invention, I provide either a flexible slip tube attached to a rigid gauge tube or a rigid slip tube enclosed in a guide tube for measuring liquid level in a tank. A coil spring surrounds the portion of the rigid slip tube which is withdrawn from the tank for observation. The inner end of the spring fits into a helical groove in the outer surface of a coupling or spring follower. In the embodiment involving a flexible dip tube, the coupling or spring follower connects the flexible tube with a rigid inspection tube. This coupling or spring follower also is provided with a helical groove in its outer surface. Both couplings or spring followers move along the spring upon rotation of the tube within the spring more or less similar to the movement of a nut on a bolt. The spring is attached rigidly to the inner wall of the guide tube through most of the length of the spring. By using a spring of relatively large pitch the dip tube can be moved axially along the guide tube with only a relatively few rotations of the dip tube so that gauging is a relatively rapid operation. Such a rapid determination of liquid level is in contrast to the use of conventional threads in which the slip tube would need to be rotated a great many turns in order to move it an appreciable distance axially for gauging purposes. By the use of such a large pitch helical spring and a spring follower as mentioned, a relatively simple latch can be used for holding the slip tube in its fully inserted position when not in operation. Such a simple latching arrangement is a conventional J-latch arrangement.

Referring now to the drawing and specifically to FIGURE 1, reference numeral 11 identifies the wall of a tank in which the liquid level gauge of my invention is installed. A bushing 41 is welded or otherwise attached to the tank wall as illustrated. Weld 54 illustrates a mode of installation of the bushing. A body member 27 is threaded into bushing 41 as illustrated. A guide tube 16 is welded at 42 at the inner end of body member 27. This guide tube 16 is provided with openings or slots 44 disposed throughout the length of the tube. A spring 25 which is a large pitch helically wound compression spring is spot welded at 26 on the inner surface of the guide tube 16 as illustrated. Disposed within the guide tube 16 and within the helical spring 25 is a gauge tube 23 which extends substantially all the way through the body member 27. To the opposite end of this gauge tube 23 is threaded a spring follower 46 which is an annular member. The threaded connection is identified by reference numeral 47. At the opposite end of the spring follower is threaded at 48 a dip tube 45. At the other end of this dip tube 45 is attached or threaded at 51 a top guide member 50. This guide member 50 has a diameter only slightly smaller than the inner diameter of the guide tube. Along the outer surface of the spring follower 46 is a helical groove 49. This groove has the same pitch as the spring 25. It is intended that the spring 25 fits into the helical groove 49 as illustrated. The portion of the spring 25 which is fitted into the spring follower 46 when the gauge tube 23 is fully inserted into the tank is not welded to the inner surface of the guide tube 16. In this position the tube 23 can be rotated a very slight extent by compressing or stretching the spring around the periphery of the spring follower when needed. In FIGURE 2 is illustrated a bayonet type or J-slot 32 which is a portion of the slip tube locking device. The end of tube 23 which extends into body member 27 is threaded to accommodate a valve member 31. Reference numeral 33 identifies the threads by which valve member 31 is attached to the end of the tube 23. One or more prongs 32a are provided on the outer periphery of this valve member, as illustrated, and these prongs fit into one or more slots 32 and when fully inserted and the valve member rotated an eighth or sixteenth of a turn, the valve member and attached parts are held firmly in place. The pressure within the tank 11 exerts a force tending to push tube 23 out of and the valve member 31 away from the tank and this force then holds the bayonet type locking device in a fully locked position. A valve wheel 34 is threaded into the body of the valve member 31 at 35 as illustrated. On the inner end of this valve wheel 34 is provided a resilient valve sealing member 36 which in a seated position makes contact with a valve seat 37. A small opening 38 provides communication from the interior of tube 23 to the underside of valve sealing member 36. When the valve sealing member 36 is raised from its seat, fluid under pressure from within the tank escapes through opening 38 and between the sealing member 36 and its seat 37 and issues through a vent 39.

The J-slot or J-slots 32, as illustrated, are arranged on the inner peripheral surface of the packing take-up nut 28.

This take-up nut holds a packing 30 tightly in place by threads 29.

A cap 22 is threaded to the outer surface of body member 27 by threads 55 for protection of the valve member 31. The resilient sealing member 40 provides a tight seal between this cap and the body member 27. A chain 43 is provided as illustrated for making certain that cap 22 does not become lost if the cap inadvertently becomes unthreaded from body member 27. An O-ring 52 is placed around tube 23 against the spring follower 46, as shown, so that upon rotation of the tube and spring follower to the left the O-ring 52 makes contact with surface 55a to prevent leakage from the tank at any time it is desired to remove the packing gland nut to repack this apparatus.

At the opposite end of the guide tube 16 is positioned an anchor plug assembly 18 for holding the adjacent end of the apparatus tightly and rigidly against vibration. This anchor plug assembly 18 comprises a coupling or bushing 12 welded at 17 into the wall of the tank 11. An anchor plug 13 is threaded at 14 into this bushing as illustrated. On the inner end of the anchor plug 13 is disposed a guide plug 15 which extends a short distance into the open end of the guide tube 16. The guide plug 15 is illustrated as being welded at 53 to the anchor plug.

In FIGURE 3 is illustrated the installation of the apparatus of FIGURE 1 in a tank. The gauge head assembly is identified by reference numeral 19 and is illustrated as being positioned in the generally lower portion of the tank so that the gauge will be disposed in an approximately upright position within the tank. For protection purposes of the gauge head assembly a shield 20 is welded to the tank at 56 as illustrated. Openings 21 are provided around the circumference of shield 20 for observing calibration markings 24 on the surface of tube 23.

At the upper end of the assembly of FIGURE 3 the anchor plug assembly is illustrated as being positioned near the top center of the tank.

The apparatus illustrated in FIGURES 1, 2 and 3 is operated by first unthreading cap 22 so as to expose the valve wheel 34 and valve member 31. In this explanation it will be assumed that the transport truck is being loaded and a considerable volume of liquefied petroleum gas is already in the tank. The calibrations 24 on the tube 23 can be marked in terms of gallons or merely in inches or any other units desired. The tank, however, is previously calibrated so that as a given mark 24 on the tube 23 becomes visible and is positioned adjacent the pointer of a pointer assembly 57, a known volume of liquid is present in the tank.

When the tank is being filled, the gauge tube is preferably in its fully inserted position with the J-slot mechanism locked to hold the tube in this position. Upon unthreading the valve wheel 34, vapor should emerge from vent 39 because with the gauge tube fully inserted its open end is positioned at a level higher than the "full" liquid level of the tank. To determine the position of the level of the liquid, it is merely necessary to push in, rotate, and pull out the tube and valve member 31 to free or unlock prongs 32a from slots 32. Then upon continued rotation of the tube 23 and valve member 31 to the left, the spring follower follows the spring, as illustrated in FIGURE 1, and the tube gradually moves outwardly from the tank thereby exposing calibrations 24. Testing for liquid, or vapor, is done merely by unthreading valve wheel 34 and allowing liquid or vapor to emerge through vent 39. Care should be taken to allow valve wheel 34 to remain open a sufficient interval of time to make certain that liquid (or vapor) emerging from vent 31 is the same phase, i.e., liquid or vapor, which is entering the open end 58 of tube 45. The tube is inserted into the tank merely by rotating in the opposite direction and locking the J-slot mechanism. The valve wheel 34 is obviously closed.

The main utility of this gauging apparatus is to determine when a tank adapted for the transport of a liquid under high pressure has been filled to capacity. As is known in such art, tanks for transportation of liquid are never entirely full. Some vapor space must be left for expansion of liquid.

One mode of operation of this apparatus is to set the tube 23 at the desired gallonage and then fill the tank until such time as liquid is vented through vent 39 upon rotation of wheel 34 to open the valve.

In FIGURES 4, 5, 6 and 7 are illustrated other embodiments of my invention in which the tube 65 which corresponds to tube 45 of FIGURE 1 is a flexible tube. This point is illustrated especially in FIGURE 7. In this figure a tube 68 corresponds to tube 23 of FIGURE 1 and the spring follower 66 corresponds to the spring follower 46 of FIGURE 1. The tube 68 and spring follower 66 can, if desired, be exactly like tube 23 and spring follower of FIGURE 1. However, tube 65 is different in the respect that it is a flexible tube and upon being moved longitudinally in guide tube 64 the flexible tube 65 must flex. In this case the gauge head assembly is identified by reference numeral 19 and is similar to the gauge head assembly of FIGURES 1 and 3. In FIGURE 7 the gauging apparatus is suitable for measuring or gauging the location of the surface of the liquid at any position along line 71. When the open end 79 of tube 65 is movable over the distance 71, the tube 68 which contains calibrations must also be movable over a distance 70 which is equal to the distance 71. If the tank in which this gauging apparatus is installed has the relatively large diameter the distance 71 may be rather long and this apparatus may need be disposed in the tank in a position as illustrated in FIGURE 6. This positioning of the horizontal portion of this gauging apparatus is disposed at an angle less than 90° with the axis of the tank for the purpose of providing suitable length 70 for movement of the rigid tube 68 a distance equal to distance 71. In this particular case a gauge head assembly shield 61 is welded to the outer surface of tank 11 by weld 62 as illustrated. This shield 61 is obviously provided with inspection openings similar to openings 21 in FIGURE 3.

In FIGURE 7 a spring 67 is disposed within the guide tube 64 as illustrated, and this spring is welded to the inner surface of the tube at spaced intervals along the spring excepting in the immediate vicinity of the spring follower 66 when the tube is in its fully inserted position. The spring is not welded to the inside of the tube in this vicinity of the spring follower so that the tube 68 and spring follower can be rotated an eighth or sixteenth of a turn for unlatching the bayonet type or the J-shaped locking device similar to that illustrated in FIGURES 1 and 2. A top guide member 69 is disposed around the upper end of the flexible dip tube 65 for proper positioning of the upper end of this tube at all times.

In FIGURES 5, 6 and 7 the dip tube arrangement is illustrated as being constructed with a right angle bend between the horizontal portion and the vertical portion. However, it is not necessary that this angle be a right angle since the angle may be greater than a right angle as illustrated in FIGURE 4. As illustrated in FIGURE 4, and in FIGURE 5, an anchor plug assembly 18 is employed to maintain the inner end of the guide tubes 63 and 64, respectively, in rigid contact with the tank so as to eliminate vibration. FIGURE 4 involves use of a flexible dip tube similar to flexible tube 65 of FIGURE 7.

In FIGURES 8 and 9 are illustrated other modes of assembly of this gauging device in tanks. In FIGURE 8 the assembly is installed vertically in the tank with the gauge head assembly being at the top of the tank while the anchor plug end is at the bottom. In FIGURE 9 the gauge head assembly is near the top of the tank but to one side, however, with the gauge extending through the axis of the tank with the anchor plug 18 at a point exactly opposite the gauge head assembly.

In FIGURE 10 is illustrated an alternate means of maintaining the inner end of the gauge assembly rigid against movement and vibration. In this figure reference numeral 16a identifies the inner end of a guide tube of the gauge assembly. This inner end 16a is inserted within a pressure head 72 as illustrated. A guide plug 74 is disposed in the center of the pressure head so that the end 16a surrounds this guide plug. On the circular surface of the guide plug 74 is disposed a hook 76 under which is disposed one end of a compression spring 73. The other end of this compression spring bears against a ring 80 with the end 75 of the spring extending through an opening in the wall near the end of tube 16a. An enclosing wall 77 surrounds the end 16a of the tube. A knurled or serrated end 78 of pressure head 72 bears tightly against the tank wall 11 to prevent slippage.

While not specifically illustrated, it is obvious that various combinations of gauges could be installed in a tank to give complete coverage of the contents. For example, two gauges similar to FIGURE 4 or 5 could be installed, with the second inverted. Thus it would be possible to gauge the liquid at all levels in the tank.

It might also be mentioned that the gauge of FIGURE 3 is intended mainly to check liquid level only in a relatively small portion of the tank, that is, when the tank is full or about full in tank filling operations. The inclined position of the gauge tube will not result in inaccurate measurements nor will it create a particularly difficult calibration problem.

The flexible dip tubes are made of copper, Phosphor bronze, or other suitable metal, which is adapted to flexing as herein disposed.

While certain embodiments of the invention have been described for illustrative purposes, the invention obviously is not limited thereto.

I claim:

1. A device for gauging liquid under pressure in a tank comprising, in combination, a body member, means to attach said body member fluid-tight in a lower portion of the wall of said tank, a conduit through said body member, the axis of said body member pointing upward and into said tank, a first tube in said tank connected with said body member, said first tube at its connection with said body member being disposed along the axis of said conduit, a slip tube within said first tube, one end of said slip tube extending fluid-tight into said conduit, a coil spring intermediate said slip tube and said first tube, said spring, said first tube and said slip tube having a common axis, an annular member attached at one end fluid-tight to the end portion of said slip tube remote from said body member, a second tube attached fluid-tight at one end to the other end of said annular member, said second tube being disposed within said first tube, said annular member completing a continuous flow path through said second tube, said annular member, and said slip tube, a helical groove disposed in the outer wall of said annular member, the pitch of said groove coinciding with the pitch of said spring in such a manner that said spring fits operably into said groove, a valve means exterior of said tank attached rigidly to said one end of said slip tube, a portion of said spring remote from said annular member being attached to the inner wall of said first tube, said spring adjacent said annular member being free to move with respect to the inner surface of said first tube in such a manner that said annular member is capable of rotation about its axis with longitudinal movement only of said spring, and said slip tube, annular member and second tube also being adapted to move axially through said first tube and said conduit upon rotation of said annular member with respect to said spring.

2. A device for gauging liquid under pressure in a tank comprising, in combination, a body member, means to attach said body member fluid-tight in a lower portion of the wall of said tank, a conduit through said body member, the axis of said body member pointing into said tank, a perforate first tube in said tank being connected at one end with said body member, said one end of said first tube being disposed along the axis of said conduit, means supporting the other end of said first tube, said means bearing firmly against the tank wall, a slip tube within said first tube, one end portion of said slip tube being rigid and extending fluid-tight into said conduit and the other end portion being a flexible tubular portion, said flexible tubular portion remote from said conduit extending upward in said tank and with its uppermost end portion being open, a valve means exterior of said tank attached to said one end of said slip tube, said slip tube being adapted to be moved axially in said conduit and in said first tube whereby the open end portion of said flexible tubular portion admits liquid when positioned in liquid in said tank and liquid exits through said valve means when the valve thereof is open thereby indicating the presence of liquid at the level of the open end portion of said flexible tube, the portion of said slip tube adjacent said conduit being rigid, the outer diameter of the rigid portion of said slip tube being smaller than the inner diameter of said first tube thereby providing an annulus therebetween, a helical spring disposed in said annulus, said spring, and the rigid portion of said slip tube and the portion of said first tube enclosing said spring having a common axis, an annular member in said annulus rigidly and operatively connecting the rigid portion of said slip tube remote from said body member with said flexible portion, a helical groove disposed in the outer surface of said annular member, the pitch of said groove coinciding with the pitch of said spring in such a manner that said spring fits operably into said groove, a portion of said spring remote from said annular member being attached to the wall of said first tube, said spring adjacent said annular member being free to move with respect to the inner surface of said first tube in such a manner that said annular member is capable of rotation about its axis through a small arc with longitudinal movement only of said spring and upon rotation of said valve means, slip tube and annular member through an arc greater than said small arc, said slip tube moves axially in said first tube.

3. A device for gauging liquid under pressure in a tank comprising, in combination, a body member, means to attach said body member fluid-tight in a lower portion of the wall of said tank, a conduit through said body member, the axis of said body member pointing into said tank, a perforate first tube in said tank being connected at one end with said body member, said one end of said first tube being disposed along the axis of said conduit, means supporting the other end of said first tube, said means bearing firmly against the tank wall, a slip tube within said first tube, one end portion of said slip tube being rigid and extending fluid-tight into said conduit and the other end portion being a flexible tubular portion, said flexible tubular portion remote from said conduit extending upward in said tank and with its uppermost end portion being open, a valve means exterior of said tank attached to said one end of said slip tube, said slip tube being adapted to be moved axially in said conduit and in said first tube whereby the open end portion of said flexible tubular portion admits liquid when positioned in liquid in said tank and liquid exits through said valve means when the valve thereof is open thereby indicating the presence of liquid at the level of the open end portion of said flexible tube, the portion of said slip tube adjacent said conduit being rigid, the outer diameter of the rigid portion of said slip tube being smaller than the inner diameter of said first tube thereby providing an annulus therebetween, a helical spring disposed in said annulus, said spring, the rigid portion of said slip tube and the portion of said first tube enclosing said spring having a common axis, an annular member in said annulus rigidly and operatively connecting the rigid portion of said slip tube remote from said body member with said flexible tubular portion, a helical groove disposed in the outer wall of said annular member, the pitch of said groove coinciding with the pitch of said spring in such a manner that said spring fits operably into said groove, a portion of said spring remote from said annular member being attached to the inner wall of said first tube, the portion of said spring adjacent said annular member being freely flexible with respect to said inner wall and to said annular member, a J-slot locking device comprising a prong on the outer periphery of said valve means and a matching J-slot in the inner periphery of said body member, said prong being removable from said J-slot upon rotation of said valve means with respect to said body member whereby said slip tube is released from said body member for gauging liquid contents of said tank.

References Cited in the file of this patent
UNITED STATES PATENTS

| | | |
|---|---|---|
| 534,164 | Larsh | Feb. 12, 1895 |
| 1,827,574 | Frazier | Oct. 13, 1931 |
| 2,090,514 | Folmsbee | Aug. 17, 1937 |
| 2,440,230 | Buttner | Apr. 20, 1948 |
| 2,705,372 | Cornell | Apr. 5, 1955 |

OTHER REFERENCES

Publication: Combination Slip Tube and Fixed Tube Liquid Level Gauge, by Bastian-Blessing. Copy 1947, only page LJ–5 is required. (Copy in Div. 36.)